US007909151B2

United States Patent
Matsumoto et al.

(10) Patent No.: US 7,909,151 B2
(45) Date of Patent: Mar. 22, 2011

(54) LOCK-UP CLUTCH MECHANISM

(75) Inventors: Hideki Matsumoto, Fukuroi (JP); Hideaki Takabayashi, Fukuroi (JP); Chisato Yagi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 484 days.

(21) Appl. No.: 11/882,009

(22) Filed: Jul. 30, 2007

(65) Prior Publication Data

US 2008/0023286 A1 Jan. 31, 2008

(30) Foreign Application Priority Data

Jul. 31, 2006 (JP) ................................ 2006-208099

(51) Int. Cl.
*F16H 45/02* (2006.01)

(52) U.S. Cl. .................. 192/3.29; 192/52.2; 192/107 R

(58) Field of Classification Search ................. 192/52.1, 192/52.2, 52.3, 52.6
See application file for complete search history.

(56) References Cited

U.S. PATENT DOCUMENTS 5,456,343 A * 10/1995 Murata et al. ................ 192/3.29
5,501,309 A * 3/1996 Walth et al. .................. 192/3.29
5,865,283 A * 2/1999 Hirayanagi et al. ......... 192/3.29
5,890,572 A * 4/1999 Hirayanagi et al. ......... 192/3.29
6,003,647 A * 12/1999 Kawamura et al. .......... 192/3.29
6,213,273 B1 * 4/2001 Menard et al. ........... 192/107 M
7,322,453 B2 * 1/2008 Kinoshita et al. ............ 192/3.28
2007/0119675 A1 * 5/2007 Toya ............................ 192/3.29

FOREIGN PATENT DOCUMENTS

JP 05-099297 4/1993
JP 11-230305 A 8/1999
JP 2004011710 A * 1/2004

* cited by examiner

*Primary Examiner* — David D Le
*Assistant Examiner* — Ryan Dodd
(74) *Attorney, Agent, or Firm* — Miles & Stockbridge P.C.

(57) ABSTRACT

The present invention provides a lock-up clutch mechanism for a torque converter, comprising a lock-up piston and a front cover having an engagement surface capable of being engaged with the lock-up piston and in which a friction material is stuck to wither one of the lock-up piston and the front cover and in which engagement and disengagement are performed in accordance with a hydraulic pressure difference between the front cover and the lock-up piston and wherein the friction material includes a first flat friction surface disposed at an outer diameter side and a second tapered friction surface disposed at an inner diameter side and further wherein, when the lock-up piston and the front cover are slip-controlled, the first friction surface is engaged with uniform face pressure, and, when the lock-up piston and the front cover are substantially integrally joined with a great hydraulic pressure difference under slip control, maximum face pressure is generated at a border between the first friction surface and the second friction surface.

5 Claims, 2 Drawing Sheets

23
2
21
B
24
13
A
22
12
25
1

LOCK-UP CLUTCH MECHANISM

BACKGROUND OF THE INVENTION

1. Field of the Invention

The present invention relates to a lock-up clutch mechanism used for a torque converter of an automatic transmission of a vehicle, and more particularly, it relates to an improvement in a friction sliding surface of such a lock-up clutch mechanism.

2. Description of the Related Art

While a torque converter used in an automatic transmission provides smooth starting, acceleration and deceleration, it has a disadvantage that transmitting efficiency is worsened since a power is transmitted via fluid. Thus, it is designed so that, if a vehicle speed exceeds a predetermined value, an engine is directly connected to drive wheels by operating a lock-up clutch mechanism including a lock-up clutch, in order to reduce energy loss and also to reduce consumption of fuel.

In recent years, in order to further reduce the consumption of fuel, the lock-up clutch mechanism has been operated even when the vehicle speed is low. In this case, in order to reduce engine vibration and transmission shock during the low vehicle speed, so-called slip lock-up control in which lock-up control is performed while maintaining a slip amount at a predetermined number of revolutions has been performed.

Further, in automatic transmissions having torque converters, in order to further reduce the consumption of fuel by using the lock-up clutch from a lower vehicle speed range, generally, the lock-up clutch for the slip control is used.

Such a lock-up clutch is used so that, in the low vehicle speed range, a piston is urged against a friction surface of a front cover by a small hydraulic pressure difference to create a predetermined slip rotating condition between the piston and the front cover, and, whereas, in a high vehicle speed range, the piston and the front cover are integrally joined by a great hydraulic pressure difference, thereby achieving complete tightening.

For example, Japanese Patent Application Laid-open No. 11-230305 (1999) proposes a technique in which, in such a lock-up clutch, the friction surface is worked or machined so that, if the hydraulic pressure difference is great, the friction surface is urged with uniform face pressure.

However, in recent years, in order to reduce the consumption of fuel and to make the torque converter lighter and more compact, there has been requested to further reduce a diameter of the lock-up clutch; to this end, a lock-up clutch having a friction surface capable of providing a greater transmitting force during the complete tightening has been needed.

Thus, in the present invention, it is designed so that, for example, a cutting amount of an inner diameter side friction surface becomes greater than an amount through which an inner diameter side of a piston is deformed toward a front cover in such a manner that a maximum face pressure position of a friction surface during complete tightening between the lock-up piston and the front cover due to a greater hydraulic pressure difference is located toward an outer diameter side from the center in a radial direction, and more particularly, located at a half position in the outer diameter side. As a result, distribution of the face pressure along the radial direction forms a mountain shape with an apex situated at the maximum face pressure position.

As is in the prior arts, if the face pressure at a contact area is uniform, a sealing ability of the outer diameter portion is worsened and a tightening force is reduced due to reduction in an urging force caused by the escaping of the hydraulic pressure on the friction surface; however, in the present invention, since the face pressure at the outer diameter side is increased, the sealing ability at the outer diameter side is enhanced, and, since the center diameter of the face pressure is situated in the outer diameter portion, transmitting torque is increased, whereby it is possible to obtain a more compact lock-up clutch.

In general, the lock-up clutch can generate self-excited vibration called as judder, thereby worsening riding comfort considerably. The judder is greatly influenced, particularly by imbalance of circumferential face pressure distribution during the slipping on the friction surface. The imbalance of the face pressure distribution is greatly influenced by accuracy of the friction surface, so that the face pressure distribution is dispersed in the circumferential direction of the friction surface by small undulation of the piston of the lock-up clutch and/or distortion of an attachment bolt for a drive plate provided on the front cover.

In order to suppress generation of such judder and to stabilize the sealing ability, the friction surface at the outer diameter side and the friction surface at the inner diameter side are cut after they are bonded.

When the friction surface is used in the slip control, the friction surface is cut to follow the configuration of the front cover or the piston so that the uniform face pressure distributions can be obtained in the circumferential and radial directions of the friction surface.

Further, the friction material at the inner diameter portion acts as a support for the entire friction material and thus is important to ensure strength. Further, by preventing yield of the friction surface, plastic deformation can be prevented.

SUMMARY OF THE INVENTION

Accordingly, an object of the present invention is to provide a lock-up clutch mechanism which is more compact and can prevent judder and can provide a stable sealing ability, by increasing transmitting torque.

To achieve the above object, the present invention provides a lock-up clutch mechanism for a torque converter, comprising a lock-up piston and a front cover having an engagement surface capable of being engaged with the lock-up piston and in which a friction material is stuck to either one of the lock-up piston and the front cover and in which engagement and disengagement are performed in accordance with a hydraulic pressure difference between the front cover and the lock-up piston and wherein the friction material includes a first flat friction surface disposed at an outer diameter side and a second tapered friction surface disposed at an inner diameter side and further wherein, when the lock-up piston and the front cover are slip-controlled, the first friction surface is engaged with uniform face pressure, and, when the lock-up piston and the front cover are substantially integrally joined with a hydraulic pressure difference greater than that under slip control, maximum face pressure is generated at a border between the first friction surface and the second friction surface.

Since, it is designed so that, for example, a cutting amount of an inner diameter side friction surface becomes greater than an amount through which an inner diameter side of the piston is deformed toward the front cover in such a manner that a maximum face pressure position of the friction surface during complete tightening is located toward an outer diameter side from the center in a radial direction, and more particularly, located at a half position in the outer diameter side, a more compact lock-up clutch mechanism can be realized, even when transmitting torque is increased.

Further, when the friction surface at the outer diameter side and the friction surface at the inner diameter side are cut after they are bonded, generation of judder can be suppressed and a sealing ability can be stabilized.

Further features of the present invention will become apparent from the following description of exemplary embodiments with reference to the attached drawings.

DESCRIPTION OF THE EMBODIMENTS

Figure 1:
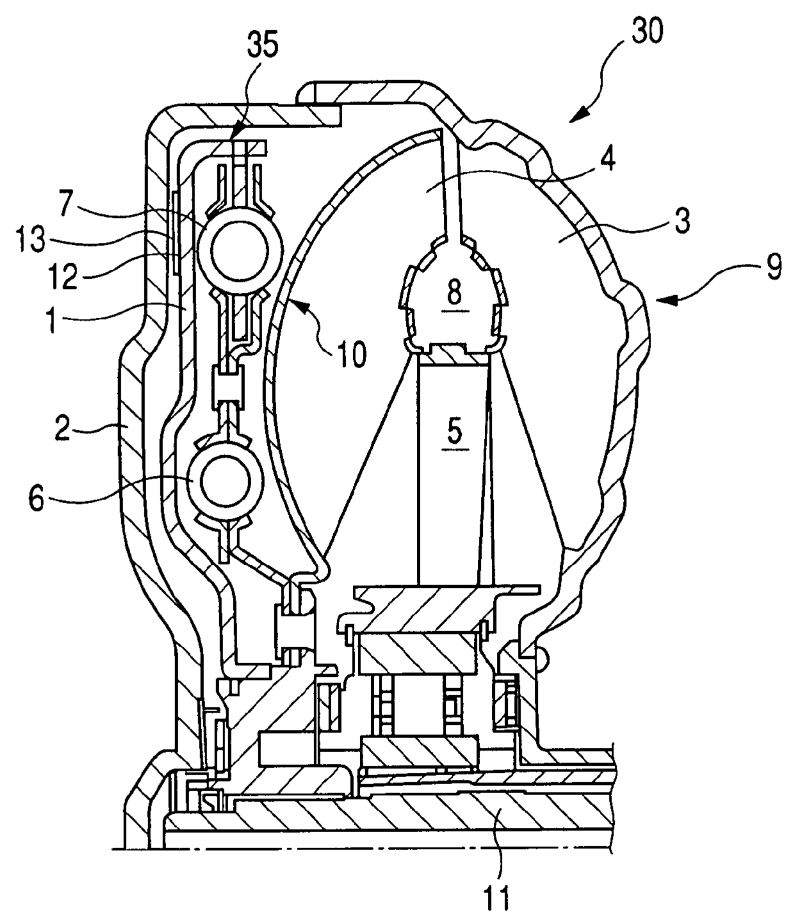
FIG. 1 is an axial partial sectional view of a torque converter including a lock-up clutch mechanism to which various embodiments of the present invention can be applied.

Now, various embodiments of the present invention will be fully explained with reference to the accompanying drawings. In the drawings, the same elements are designated by the same reference numerals. Further, it should be noted that embodiments which will be described hereinbelow are merely examples of the present invention and do not limit the present invention in all senses.

FIG. 1 is an axial partial sectional view of a torque converter 30 including a lock-up clutch mechanism to which various embodiments of the present invention can be applied and shows a released or disengaged condition of a lock-up clutch. The torque converter 30 comprises a front cover 2 forming a part of a housing of the torque converter 30, an impeller 9 as a donut-shaped vane wheel secured to the front cover 2, a turbine 10 having as a donut-shaped vane wheel having vanes opposed to vanes of the impeller 9, and a stator 5 rotatably disposed between the impeller 9 and the turbine 10. The impeller 9, turbine 10 and stator 5 constitute a main body of the torque converter.

The impeller 9 is connected to a crankshaft of an engine (not shown) of a vehicle and is rotated together with the front cover 2 when the engine is rotated. Further, the turbine 10 is directly connected to an output shaft 11 and is also connected to vehicle wheels (not shown) via a transmission mechanism (not shown). The stator 5 is disposed a substantially central position between the impeller 9 and serves to change a flow of fluid being filled within the torque converter 30.

Between an inner surface of the front cover 2 and an outer surface of the turbine 10, there is provided a lock-up clutch or lock-up piston 1 as an annular plate capable of performing a piston movement, which lock-up piston constitutes a lock-up clutch mechanism 35 and has a surface which is opposed to the inner surface of the front cover 2 and to which a friction material 12 is stuck by an adhesive. The lock-up piston is rotated integrally with the output shaft 11. A friction surface 13 of the annular friction material 12 is opposed to the inner surface of the front cover 2. Incidentally, for simplifying the explanation, "lock-up piston" is referred merely as "piston" hereinafter.

Between the outer surface of the turbine 1 and the piston 1, there is provided a damper mechanism comprising coil springs 6 and 7 in order to dampen the shock generated upon the engagement of the piston 1. Further, a central space 8 is defined in a central portion of the torque converter 30.

Next, an operation of the piston 1 will be explained. If a speed of a vehicle exceeds a predetermined value, feedback control is performed by a control mechanism (not shown), so that a flow of fluid in the torque converter 30 defined by the impeller 9 and the turbine 10 is automatically changed. Due to such a change, the piston 1 is urged against the inner surface of the front cover 2 to firmly engage the friction material 12 of the piston 1 with the inner surface of the front cover 2, thereby achieving a direct connection condition of the piston 1 in which a driving force of the engine is directly transmitted to the output shaft 11. Accordingly, since a drive side and an output side are mechanically locked up without the interposition of the fluid (directly connected), loss of the fluid can be prevented and consumption of fuel can be reduced.

Incidentally, the torque converter 30 is connected to an oil pressure control mechanism (not shown), and the oil pressure control mechanism serves to change (increase or decrease) a flow rate of oil in order to maintain a slip condition of the lock-up piston or piston 1, while keeping a pressure difference (pressure difference across the piston 1) between two oil paths on both sides of the piston 1, i.e. between an outer circumferential side and an inner circumferential side substantially constant. By increasing the pressure difference, a complete tightening condition between the piston 1 and the front cover 2 can be obtained.

Figure 2:
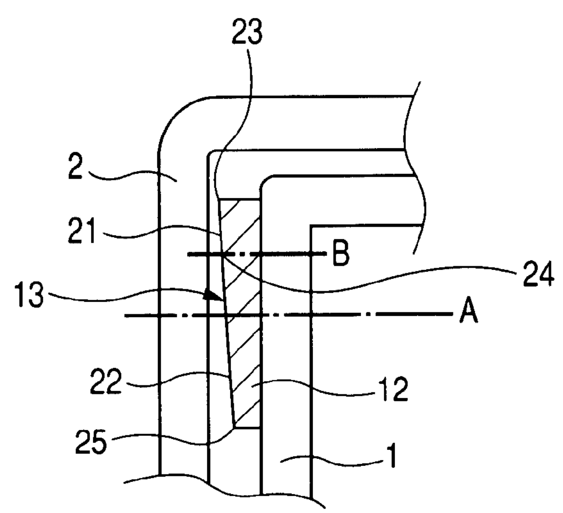
FIG. 2 is a partial sectional view of a lock-up clutch mechanism in a released condition, showing an embodiment of the present invention.

FIG. 2 a partial sectional view of the lock-up clutch mechanism, showing an embodiment of the present invention. FIG. 2 shows the lock-up clutch mechanism 35 in a released or disengaged condition. The piston 1 has the friction material 12 stuck to a surface of the piston opposed to the front cover 2. The substantially annular friction material 12 has a first flat friction surface 21 at an outer diameter side, and a second tapered friction surface 22 contiguous to the friction surface 21.

The first friction surface 21 extends from an outer diameter end 23 to an inner diameter end 24 and is a substantially flat surface (although slightly inclined toward the outer diameter side). Further, the second friction surface 22 extends continuously from the inner diameter end 24 of the first friction surface 21 to an inner diameter end 25.

Figure 3:
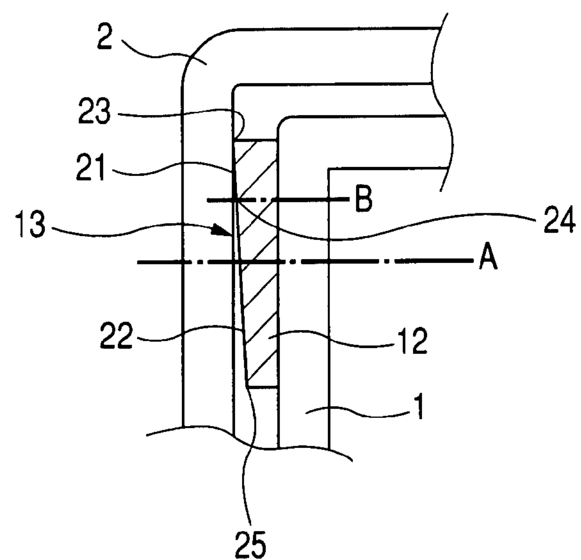
FIG. 3 is a partial sectional view of the lock-up clutch mechanism, showing a slip control condition.
Figure 4:
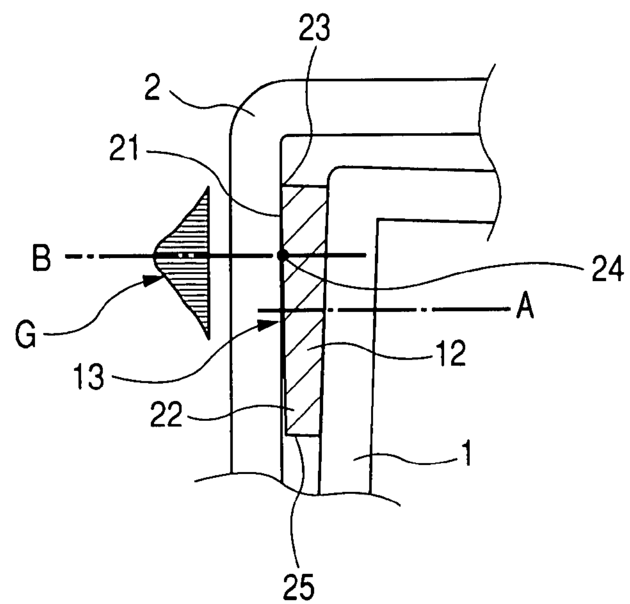
FIG. 4 is a partial sectional view of the lock-up clutch mechanism, showing a tightened or engaged condition.

The first friction surface 21 and the second friction surface 22 are contacted with each other with a certain angle therebetween, and the second friction surface 22 is inclined away from the front cover 2 by an amount greater than an amount through which the inner diameter side of the piston 1 is deformed toward the front cover 2 by the great pressure difference. As shown, the second friction surface 22 has a minimum axial thickness at the inner diameter end 25. In FIGS. 2 to 4, the line A indicates a substantially center of the friction material 12 in a radial direction, and the line B corresponds to the position of the inner diameter end 24 and indicates a position of about ¼ of the friction material 12 from the outer diameter end.

The first friction surface 21 and the second friction surface 22 are cut, and, particularly, the second friction surface 22 is cut in such a manner that it is inclined away from the front cover 2 by an amount greater than an amount through which the inner diameter side of the piston 1 is deformed toward the front cover 2 by the great pressure difference.

The first friction surface 21 is a surface which is contacted with the front cover 2 with uniform face pressure. Since the piston 1 is slightly deformed even in the slip control, the first friction surface 21 is formed to be slightly inclined toward the outer diameter side to ensure the uniform contact. Further, the second friction surface 22 is formed as a tapered slope surface having a thickness decreasing from the inner diameter end 24 of the first friction surface 21 to the inner diameter end 25 of the second friction surface 22.

FIG. 3 is a partial sectional view of the lock-up clutch mechanism, showing the slip control condition. In this condition, the piston 1 was displaced toward the front cover 2 from the released condition of FIG. 2 and the first friction surface 21 abutted against the inner surface of the front cover 2.

When the slip control of the piston 1 and the front cover 2 is performed; the first friction surface 21 is engaged with the inner surface of the front cover 2 with the uniform face pressure. As can be seen from FIG. 3, in the slip control, the second friction surface 22 is not contacted with the inner surface of the front cover 2.

FIG. 4 a partial sectional view of the lock-up clutch mechanism, showing a tightened or engaged condition. In this condition, the piston 1 and the front cover 2 are tightened substantially integrally by the oil pressure difference greater than that in the slip control condition of FIG. 3. Accordingly, the first friction surface 21 and the second friction surface 22 are urged against the inner surface of the front cover 2 substantially completely.

In this case, maximum face pressure is generated at a border between the first friction surface 21 and the second friction surface 22, i.e. at the inner diameter end 24 of the first friction surface 21. As shown in FIG. 3, upon the tightening, due to the great oil pressure difference, the inner diameter portion of the piston 1 is expanded, with the result that the inner diameter side approaches the front cover 2 more than the outer diameter side. Accordingly, as shown in FIG. 3, the front cover 2 and the piston 1 are not parallel with each other.

An area where the maximum face pressure is generated on the friction surface is the border between the first friction surface 21 and the second friction surface 22, i.e. the inner diameter end 24 of the first friction surface 21. A peak of a face pressure distribution curve indicated by G corresponds to the inner diameter end 24. That is to say, radial distribution of the face pressure has a mountain shape with the peak or apex situated at the maximum face pressure position.

As shown in FIGS. 2 to 4, the border or inner diameter end 24 where the maximum face pressure is generated is located at a substantially center of an outer diameter side area obtained by bisecting the friction material 12 in the radial direction.

In the various embodiments described above, while an example that the friction material 12 has a substantially annular shape was explained, the friction material does not necessarily have an annular shape, but the friction material may be obtained by arranging a plurality of friction material segments in an annular fashion. Further, the friction material may have different thicknesses along the radial direction.

Further, while only an example that the friction material is stuck to the lock-up piston was explained, of course, the friction material may be stuck to the front cover.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-208099, filed Jul. 31, 2006, which is incorporated by reference herein in its entirety.

What is claimed is:

1. A lock-up clutch mechanism for a torque converter, comprising a lock-up piston and a front cover having an engagement surface capable of being engaged with said lock-up piston, and in which a friction material is stuck to a planar surface of one of said lock-up piston and said front cover, and in which engagement and disengagement are performed in accordance with a hydraulic pressure difference between said front cover and said lock-up piston, wherein:

said friction material includes a first friction surface disposed at an outer diameter side and a tapered second friction surface disposed at an inner diameter side; and wherein:

when said lock-up piston and said front cover are slip-controlled, said first friction surface is engaged with uniform face pressure, and, when said lock-up piston and said front cover are substantially integrally joined with a greater hydraulic pressure difference than under slip control, maximum face pressure is generated at a border between said first friction surface and said second friction surface, said border being located at about one-fourth-way from the outer diameter end to the inner diameter end of the friction material, and said first friction surface and said second friction surface are formed at a certain angle not coplanar with respect to each other, and said second friction surface is inclined away from said front cover by an amount greater than an amount through which the inner diameter side of said piston is deformed toward said front cover by said greater hydraulic pressure difference.

2. A lock-up clutch mechanism according to claim 1, wherein said first friction surface and said second friction surface are cut surfaces.

3. A lock-up clutch mechanism according to claim 1, wherein the second friction surface is arranged such that, when said lock-up piston and said front cover are slip-controlled, the second friction surface does not contact the other of said lock-up piston and said front cover.

4. A lock-up clutch mechanism according to claim 1, wherein the second friction surface is arranged such that, when said lock-up piston and said front cover are substantially integrally joined with the greater hydraulic pressure difference, an inner diameter portion of the second friction surface does not contact the other of said lock-up piston and said front cover.

5. A lock-up clutch mechanism according to claim 1, wherein a thickness of an outer diameter end of said friction material is greater than a thickness of an inner diameter end of said friction material.

* * * * *